United States Patent [19]
Burgess et al.

[11] Patent Number: 5,392,898
[45] Date of Patent: Feb. 28, 1995

[54] DUAL DRIVE CONVEYOR SYSTEM WITH VIBRATIONAL CONTROL APPARATUS AND METHOD OF DETERMINING OPTIMUM CONVEYANCE SPEED OF A PRODUCT THEREWITH

[75] Inventors: Ralph D. Burgess Jr.; David Martin, both of Plymouth; Fredrick D. Wucherpfennig, Bloomington, all of Minn.

[73] Assignee: Food Engineering Corporation, Minneapolis, Minn.

[21] Appl. No.: 254,320

[22] Filed: Jun. 6, 1994

[51] Int. Cl.⁶ .............................................. B65G 25/00
[52] U.S. Cl. ...................... 198/750; 198/751; 198/770
[58] Field of Search .............. 198/750, 751, 770; 74/61, 87

[56] References Cited

U.S. PATENT DOCUMENTS

| | | | |
|---|---|---|---|
| 1,280,269 | 10/1918 | Miller | 198/770 |
| 2,876,891 | 3/1959 | Long et al. | |
| 2,895,064 | 7/1959 | Hoff et al. | |
| 2,951,581 | 9/1960 | Long et al. | |
| 2,997,158 | 8/1961 | Moskowitz et al. | |
| 3,053,379 | 9/1962 | Roder et al. | 198/770 |
| 3,087,602 | 4/1963 | Hinkle, Jr. | |
| 3,195,713 | 7/1965 | Morris et al. | |
| 3,209,894 | 10/1965 | Baechli | |
| 3,327,832 | 6/1967 | Kyle | |
| 3,332,293 | 7/1967 | Austin et al. | 74/61 |
| 3,348,664 | 10/1967 | Renner | |
| 3,358,815 | 12/1967 | Musschoot et al. | |
| 3,433,311 | 3/1969 | Lebelle | 74/61 |
| 3,604,555 | 9/1971 | Couper | |
| 3,621,981 | 11/1971 | Nimmo | |

(List continued on next page.)

FOREIGN PATENT DOCUMENTS

| | | |
|---|---|---|
| 599119 | 5/1960 | Canada |
| 606585 | 10/1960 | Canada |
| 55-89118 | 7/1980 | Japan |
| 55-140409 | 11/1980 | Japan |
| 828219 | 2/1960 | United Kingdom |
| 307950 | 9/1971 | U.S.S.R. |

Primary Examiner—Joseph E. Valenza
Attorney, Agent, or Firm—Schroeder & Siegfried

[57] ABSTRACT

A dual drive conveyor system which has a vibration control mechanism for adjusting the application of vibratory force to the material-conveying member without changing the direction of the resultant line of vibratory force generated thereby, wherein the vibration generator connected to the material-conveying member includes a pair of opposing parallel counter-rotating eccentrically weighted master shafts driven by a first drive motor, and a pair of opposing parallel counter-rotating eccentrically weighted slave shafts driven by a second drive motor, the master and slave shafts rotating in such manner that the direction of the resultant line of vibratory force is substantially only parallel with the longitudinal centroidal axis of the material-conveying member. The vibration control mechanism monitors the angular position of the eccentric weights carried by the slave shafts relative to the eccentric weights carried by the master shafts and compares the relative angular displacement therebetween to a preselected target angular displacement, and automatically and periodically adjusts the speed of the drive motor for the slave shafts in order to change the angular position of the eccentric weights carried thereby to cause the relative angular displacement between the eccentric weights carried by the slave and master shafts to match the preselected target angular displacement therebetween. The target angular displacement may be changed during the operation of the conveyor system to cause the vibration control mechanism to readjust the relative positions of eccentric weights carried by the master and slave shafts to meet a newly selected target angular displacement therebetween. By monitoring the speed of conveyance of a given material for various selected angular displacements between eccentric weights carried by the slave and master shafts, an optimal application of vibratory force can be determined for providing the best conveyance for any such material.

30 Claims, 8 Drawing Sheets

U.S. PATENT DOCUMENTS

| | | |
|---|---|---|
| 3,693,740 | 9/1972 | Lewis et al. . |
| 3,796,299 | 3/1974 | Musschoot . |
| 3,834,523 | 9/1974 | Evans . |
| 3,848,541 | 11/1974 | Hondzinski . |
| 3,877,585 | 4/1975 | Burgess, Jr. . |
| 3,882,996 | 5/1975 | Musschoot . |
| 4,162,778 | 7/1979 | Kraft . |
| 4,196,637 | 4/1980 | Barrot et al. . |
| 4,255,254 | 3/1981 | Faust et al. . |
| 4,260,051 | 4/1981 | Burghart . |
| 4,356,911 | 11/1982 | Brown . |
| 4,369,398 | 1/1983 | Lowry, Sr. . |
| 4,423,844 | 1/1984 | Sours et al. . |
| 4,482,046 | 11/1984 | Kraus . |
| 4,495,826 | 1/1985 | Musschoot . |
| 4,787,502 | 11/1988 | Sullivan . |
| 4,932,596 | 6/1990 | Sullivan . |
| 5,064,053 | 11/1991 | Baker .................................. 198/770 |
| 5,094,342 | 3/1992 | Kraus et al. . |
| 5,131,525 | 7/1992 | Musschoot ........................... 198/770 |

DUAL DRIVE CONVEYOR SYSTEM WITH VIBRATIONAL CONTROL APPARATUS AND METHOD OF DETERMINING OPTIMUM CONVEYANCE SPEED OF A PRODUCT THEREWITH

BACKGROUND OF THE INVENTION

The instant invention is related generally to vibratory conveyors, and more specifically to the art of controlling the application of vibratory force to the material-conveying member of a conveying system so as to alter the motion thereof to adjust the speed and/or direction of conveyance for different materials having varying physical properties.

Vibratory conveyors have long since been utilized in manufacturing plants for conveying all types of various goods having different weights, sizes and other physical characteristics. Through the use of such conveyors, it has become apparent that articles having different physical characteristics frequently convey better under different vibratory motions, and therefore require a different application of vibratory force to the material-conveying member to obtain the optimal conveyance speed of the material being conveyed. It is also desirable under certain circumstances to change the direction in which the material is conveyed.

Most conventional vibratory conveyors are of the type which "bounce" the conveyed goods along the path of conveyance on the material-conveying member of the conveyor system. Such conveyors of the conventional type generate a resultant vibratory force which is directed at an angle relative to the desired path of conveyance (angle of incidence), so that the material being conveyed is physically lifted from the material-conveying member and urged forwardly as a result of the vibratory force applied thereto. In order for such a conventional "bouncing" vibratory system to operate effectively, the vibratory force must be of a magnitude sufficient to overcome the weight of the material being conveyed, and must have a substantial vertical component. Such a vertical component of force is undesirable due to both the damaging vertical forces resultant on the building structure supporting the conveyor, and the product breakage which occurs when fragile products are bounced along the conveyor.

The need to convey various materials of differing weights and physical characteristics more effectively have lead to efforts in designing conveyor systems in which the direction of the application of vibratory force to the material-conveying member, and consequently the motion thereof, may be altered to accommodate such differing materials. For such conveyors of the conventional type, efforts have been made to change the angle of incidence of the resultant vibratory force in order to adjust the speed and/or direction of conveyance. For instance, as shown in U.S. Pat. No. 3,053,379, issued to Roder et al on Sep. 11, 1962, a conveyor system is provided with a pair of opposing counter-rotating eccentric weights which produce a resultant vibratory force along a centerline between such weights and through the center of gravity of the material-conveying member. Each eccentric weight is driven by a separate motor, and by reducing the power to one of such motors, the eccentric weight driven thereby is effectively pulled along by the rotational power of the first motor at a synchronous speed, but with the eccentric weight lagging in phase, thereby changing the angle of incidence of the resultant vibratory force applied to the material-conveying member.

By way of another example, as shown in U.S. Pat. No. 5,064,053, issued to Baker on Nov. 12, 1991, one of the rotating eccentric weights of the vibration-generating means may be mechanically altered in its angular position relative to the remaining rotating eccentric weights, thereby again causing a change in the angle of incidence of the resultant vibratory force, which may change the effective speed of conveyance, as well as the direction of conveyance, if desired.

More recently, however, because the "bouncing" nature of such conventional conveyors tends to damage the products conveyed thereby, and produce substantial noise and dust, product manufacturers have sought the use of conveyor systems of a different type which are substantially devoid of vibrational forces normal to the desired path of conveyance. Such conveyor systems, similar to a conventional SLIP-STICK conveyor, manufactured by Triple S Dynamics Inc., P.O. Box 11037, 1031 S. Haskell Avenue, Dallas, Tex. 75223, or similar to that shown in U.S. Pat. No. 5,131,525, issued to Musschoot on Jun. 21, 1992, operate on the theory of a slow-advance/quick return conveyor stroke, which conveys the product while advancing slowly, and causes the product to slip on the rapid return stroke by breaking the frictional engagement of the material with the material-conveying member. Conveyors of this type do not have the negative effects which are produced by the conventional "bouncing" type conveyor, since they employ motion which is substantially only parallel with the desired path of conveyance, and virtually eliminate all motion perpendicular (normal) thereto.

However, because the resulting conveyor stroke of such conveyors must remain devoid of components of force in a direction normal to the desired path of conveyance, the application of vibratory force to the material-conveying member cannot be changed by altering the angle of incidence of the resultant vibratory force, as done with conventional conveyors. To do so would destroy the intended function and mode of operation of such a conveyor system. Therefore, as shown in U.S. Pat. No. 5,131,525, the vibratory drive system of such conveyors are set such that the eccentric weights used for generating the resultant vibratory force are disposed in a fixed position relative to one another, thereby creating the desired slow-advance/quick return conveyor stroke which is substantially only in a direction parallel with the desired path of conveyance. No mechanical means is provided for adjusting the application of the resultant vibratory force to the material-conveying member, much less doing so without changing the direction of the resultant line of force produced thereby.

As can be seen from the above, there is a distinct need for a vibratory conveyor system which is capable of transmitting vibratory forces to the material-conveying member substantially only in a direction parallel with the desired path of conveyance, while providing means for adjusting the application of vibratory force to the material-conveying member, without changing the direction of the resultant line of vibratory force generated thereby. Providing such capability in a single vibratory conveyor system will enable the user thereof to easily and effectively change the motion of the material-conveying member to match the physical characteristics of the material being conveyed thereby, and to alter the speed and/or direction of conveyance, without destroying the intended function of the conveyor system by introducing undesirable components of force in a direction normal to the desired path of conveyance for the material.

BRIEF SUMMARY OF THE INVENTION

To meet the above objectives, we have developed a vibratory conveyor system which operates with a slow-advance/quick return conveyor stroke that is directed substantially only along a line parallel with the longitudinal centroidal axis of the material-conveying member, and which includes means for controlling the application of vibratory force to the material-conveying member. Through our unique construction, the application of vibratory forces to the material-conveying member may be altered at will, without affecting the direction of the resultant line of vibratory force, and without introducing any component of force which is transverse to the desired path of conveyance.

Our conveyor system includes a vibration-generating means which has dual drive motors for operating opposing pairs of master and slave vibrator shafts. A first drive motor drives a pair of opposing parallel counter-rotating master shafts at a predetermined speed. Such master shafts are symmetrically positioned and disposed transversely relative to the longitudinal centroidal axis of the material-conveying member. The counter-rotating master shafts carry corresponding opposing eccentrically mounted weights of equal mass which are cooperatively positioned relative to one another so as to cancel substantially all of each other's vibratory forces which are generated in a direction normal to the longitudinal centroidal axis of the material-conveying member. Therefore, the resultant force produced by the eccentric weights carried by the master shafts is always along a line substantially only in a direction parallel with the longitudinal centroidal axis of the material-conveying member, and parallel with the desired path of conveyance.

The second drive motor is drivingly connected to a pair of parallel opposing counter-rotating slave shafts which are symmetrically positioned and transversely disposed relative to the longitudinal centroidal axis of the material-conveying member. The opposing counter-rotating slave shafts also carry corresponding opposing eccentrically mounted weights of equal mass which are cooperatively positioned so as to cancel substantially all of each other's vibratory forces which are generated in a direction normal to the longitudinal centroidal axis of the material-conveying member. The second drive motor normally rotates the slave shafts at a speed averaging twice the speed of the master shafts, but may be varied temporarily through the use of a vibration control mechanism to produce a desired relative angular displacement or phase differential between the angular position of the eccentric weights carried by the slave shafts and those eccentric weights carried by the master shafts.

As used herein, the phrase "relative angular displacement" or "phase differential" means the extent of angular difference between the relative angular position of an eccentric weight carried by a slave shaft and the relative angular position of an eccentric weight carried by a master shaft at a given point of reference. For instance, if the eccentric weight of reference on a master shaft is rotating about a horizontal axis in the clockwise direction, and at one instant in time, is positioned at its lowest vertical point of rotation, and the eccentric weight of reference on a similarly oriented and rotating slave shaft is positioned at its highest vertical point of rotation, the relative angular displacement or phase differential between the two referenced weights will be 180 degrees at that instant.

The vibration control mechanism mentioned above utilizes optical encoders and proximity sensors to sense the relative angular positions of the eccentric weights carried by the master and slave shafts, and to automatically and continually monitor the relative phase or angular displacement therebetween. A master encoder is carried by one of the master shafts, which generates a pulse train that is used in monitoring the speed and direction of the master shafts, and in determining a target speed for operation of the second drive motor connected to the slave shafts. A master proximity sensor is mounted adjacent one of the eccentric weights carried by a master shaft for monitoring the relative angular position of the eccentric weights carried by such master shafts during rotation thereof.

A slave encoder is similarly mounted on one of the slave shafts, and a slave proximity sensor is mounted adjacent one of the eccentric weights carried by a slave shaft to sense the angular position of the eccentric weights on the slave shafts during rotation thereof. The vibration control mechanism counts the number of pulses generated by the slave encoder between such time that the presence of a master eccentric weight is sensed and such time that the presence of a slave eccentric weight is sensed, thereby determining a pulse count representative of the relative angular displacement therebetween.

The angular displacement data generated by the slave encoder is transmitted to comparator circuitry within the vibration control mechanism, which compares the calculated actual relative angular displacement between the eccentric weights carried by the slave shafts and those carried by the master shafts with a preselected target angular displacement therebetween. The comparator continually and periodically compares the actual relative angular displacement with the preselected target angular displacement, and signals the inverter of the second drive motor to cause adjustment of the speed thereof to produce a relative angular displacement that matches the target angular displacement. Adjustments of the second drive motor are continually made, as needed, to maintain the relative angular displacement at the desired target angular displacement between the eccentric weights carried by the slave and master shafts.

Changing the speed of the second drive motor does not alter the angular position of the eccentric weight on one slave shaft relative to the eccentric weight on the other slave shaft. Nor does changing the speed of the second drive motor have any affect on the angular position of the eccentric weight on one master shaft relative to the eccentric weight on the other master shaft. As the speed of the second drive motor increases or decreases, the eccentric weights carried by opposing slave shafts, and the eccentric weights carried by opposing master shafts, continue to cancel substantially all of each other's vibratory forces generated in a direction normal to the longitudinal centroidal axis of the material-conveying member. Hence, by altering only the angular position of the eccentric weights carried by the slave shafts relative to the eccentric weights carried by the master shafts, the direction of the resultant line of vibratory force generated will not change, but the application of the vibratory force to the material-conveying member will change.

By continually monitoring the relative angular positions of the eccentric weights of the drive system, a new target angular displacement may be selected during operation of the conveyor system, thereby causing automatic adjustment of the speed of the second drive motor to cause the relative angular displacement between the eccentric weights carried by the master and slave shafts to change to the newly selected target angular displacement therebetween. The capability of changing the phase or relative angular displacement between the eccentric weights carried by the master and slave shafts is advantageous in that the application of vibratory force to the material-conveying member may be altered as desired without changing the direction of the resultant line of vibratory force imparted thereto. This enables an operator of the conveyor system to change the application of vibratory force to better handle materials having different physical properties, and obtain the optimal conveyor speed therefor, without introducing undesirable forces in a direction normal to the desired path of conveyance.

Indeed, for any given material, the relative angular displacement between the eccentric weights carried by the slave and master shafts may be continually monitored and adjusted until the best application of vibratory force to the material-conveying member is determined, which will produce the optimal conveyor speed for the material being conveyed thereby. By making such adjustments between the angular position of the eccentric weights carried by the slave shafts relative to the angular position of the eccentric weights carried by the master shafts, both the speed of conveyance and direction of conveyance may be altered at will during the operation of the conveyor system, without introducing any undesirable components of force in a direction normal to the longitudinal centroidal axis of the material-conveying member or path of conveyance defined thereby. This represents a distinct advantage over conventional conveyor systems which necessarily require a change in the direction of the resultant line of vibratory force in order to change the speed or direction of conveyance.

BRIEF DESCRIPTION OF THE DRAWINGS

These and other objects and advantages of the invention will more fully appear from the following description, made in connection with the accompanying drawings, wherein like reference characters refer to the same or similar parts throughout the several views, and in which.

DETAILED DESCRIPTION OF THE INVENTION

Figure 1:
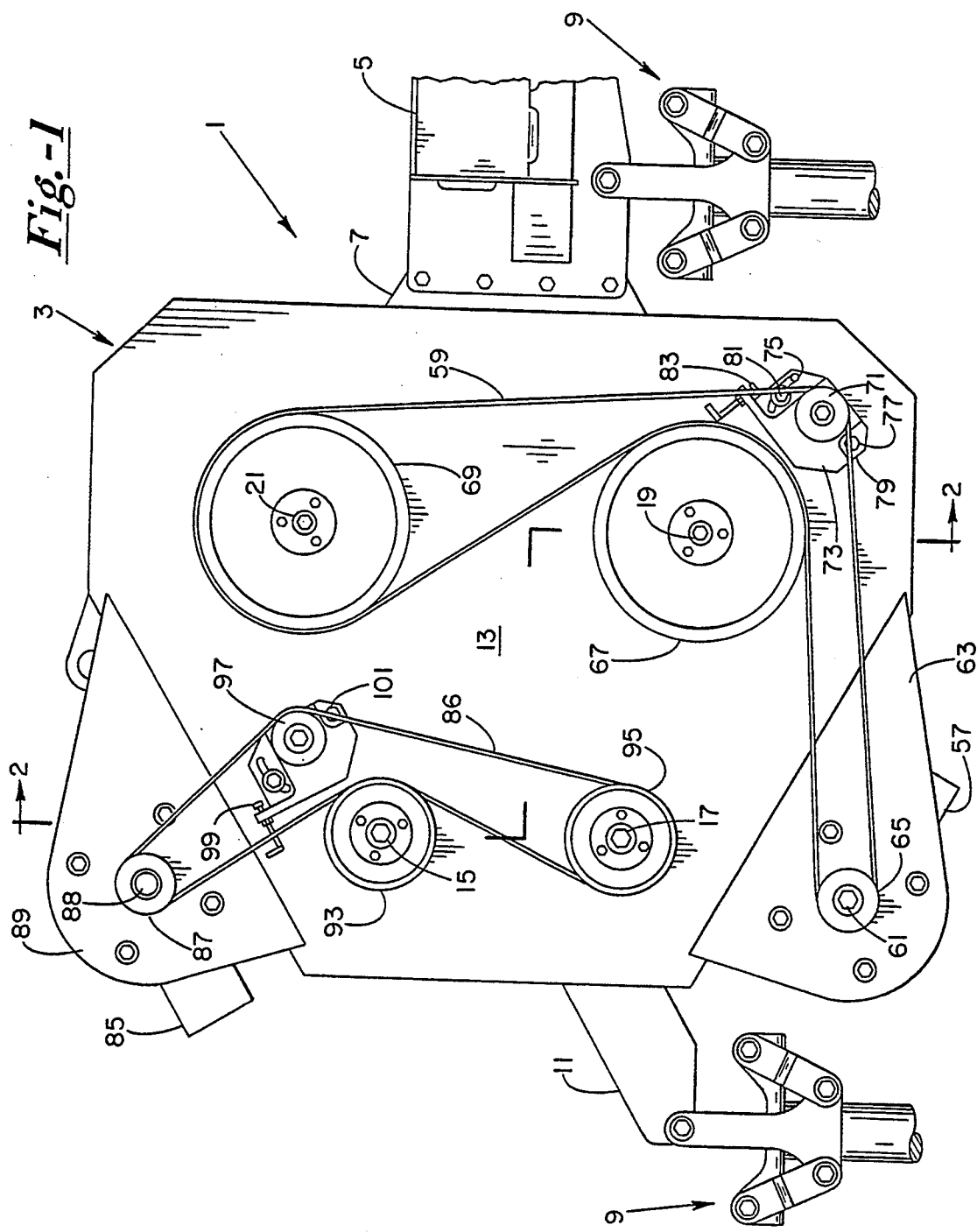
FIG. 1 is a side-elevational view of the vibration-generating means for a vibratory conveyor embodying our invention, and showing separately driven sets of master and slave vibrator shafts.

Shown in FIG. 1 is a vibratory conveyor system 1 which embodies our invention and includes generally a vibration-generating means 3 to which an elongated material-conveying member 5 is fixedly secured via bracket 7, which protrudes outwardly from the forward end of vibration-generating means 3. The material-conveying member 5 is supported by support mechanism 9, which functions to restrict movement of the material-conveying member 5 to a plane which is substantially only parallel to its longitudinal centroidal axis, and path of conveyance defined thereby. The construction and function of support mechanism 9 is described and claimed in copending U.S. Patent application Ser. No. 08/253,768, entitled "Conveyor Support Apparatus for Straight-Line Motion," the inventor of which is Ralph D. Burgess, Jr., and the contents of which are hereby incorporated by reference thereto. Similarly, the rear end of vibration-generating means 3 is also supported by a support mechanism 9 which pivotally secures to vibration generating means 3 via bracket 11 in a manner as described in the above-referenced application.

The subject of the instant application pertains particularly to the construction of the vibration-generating means 3, which is designed to include a vibration control mechanism 103 (described in detail hereinafter) that permits alteration of the application of vibratory force to the material-conveying member 5 without changing the direction of the line of the resultant vibratory force imparted thereto, and without introducing any components of force to the material-conveying member 5 which are transverse to the longitudinal centroidal axis thereof. Vibration-generating means 3 includes housing 13 which supports in rotatable relation a plurality of vibrator shafts 15, 17, 19 and 21 therewithin. Housing 13 further includes side access openings (not shown) which are covered by removable access plates 23 and 25. Access plate 23 includes a pair of spaced openings, the upper opening 27 (shown in FIG. 2) receiving a bearing assembly 29 for rotative support of vibrator shaft 15, which is journaled therethrough. The opposite end of vibrator shaft 15 is journaled through opening 28 in the opposite side of housing 13, and is similarly supported by a bearing assembly 29 for rotative support therein.

The lower opening (not shown) in access plate 23 also receives a bearing assembly 29 for rotative support of vibrator shaft 17, which is journaled therethrough. The opposite end of vibrator shaft 17 is similarly journaled through the opposite side of housing 13, where it is supported by another bearing assembly 29 for rotative support therein. For reasons which will become apparent hereinafter, vibrator shafts 15 and 17 shall hereafter be referred to as slave shafts 15 and 17.

Access plate 25 similarly has vertically spaced openings, the lower opening 31 of which receives a bearing assembly 29 for rotative support of vibrator shaft 19, which is journaled therethrough. The opposite end of vibrator shaft 19 is journaled through opening 32 in the opposite side of housing 13, and is similarly supported by a bearing assembly 29 for rotative support therein. The upper opening (not shown) in access plate 25 also receives a bearing assembly 29 for rotative support of vibrator shaft 21, which is journaled therethrough. The opposite end of vibrator shaft 21 is similarly journaled through the opposite side of housing 13, where it is supported by another bearing assembly 29 for rotative support therein. For reasons which will become apparent hereinafter, vibrator shafts 19 and 21 shall hereafter be referred to as master shafts 19 and 21.

Figure 2:
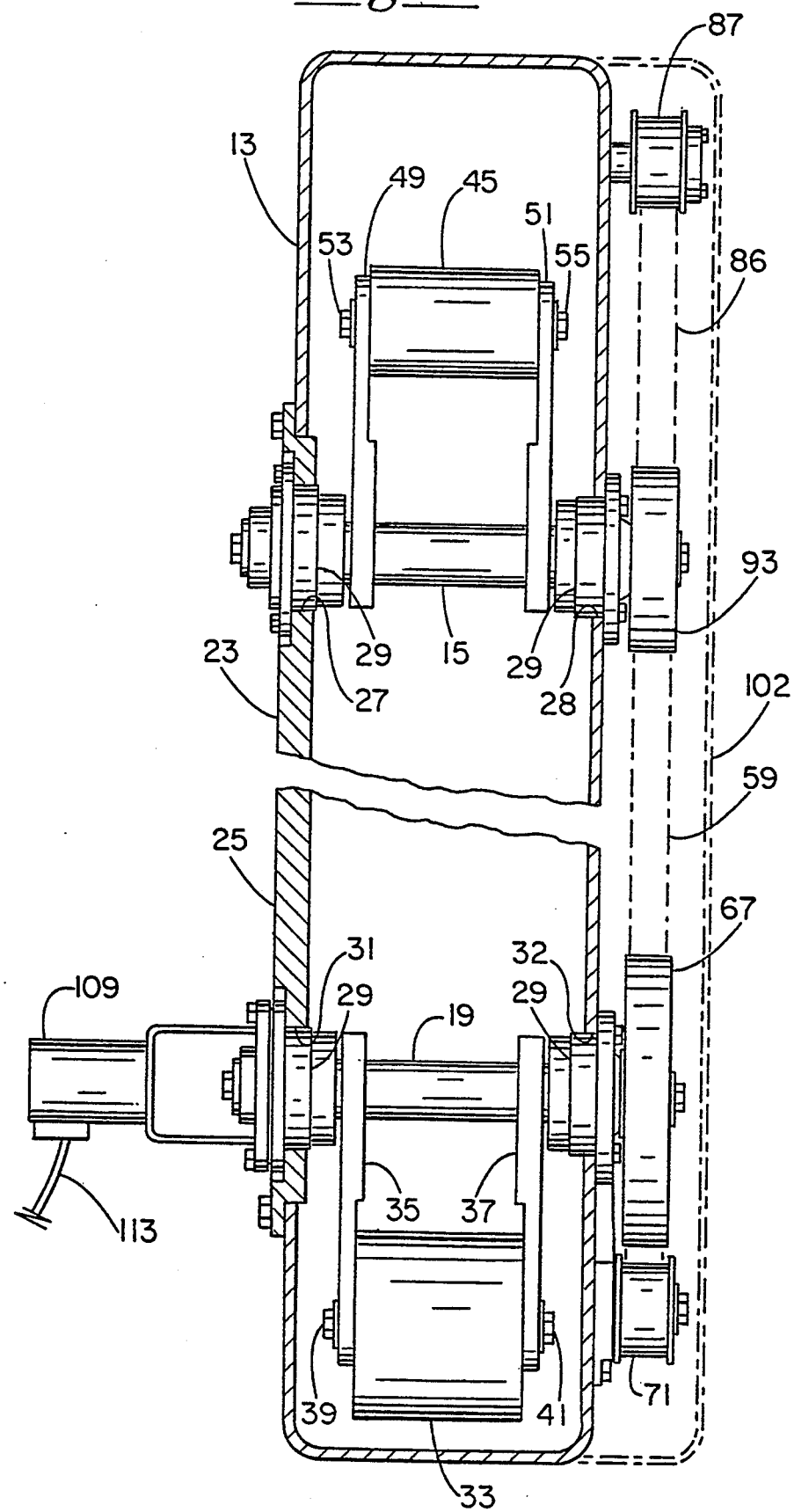
FIG. 2 is a vertical sectional view taken along lines 2—2 in FIG. 1, illustrating the construction of the master and slave shafts which carry eccentrically mounted weights within the housing of the vibration-generating means.

Master shafts 19 and 21 extend parallel to one another, are symmetrically positioned above and below the longitudinal centroidal axis of the material-conveying member 5, and rotate at a predetermined synchronous speed about a transverse axis relative thereto. As best shown in FIG. 2, master shaft 19 carries an eccentrically mounted weight 33 which is fixedly mounted thereto for free-swinging movement therewith by a pair of spaced support arms 35 and 37, which connect to opposite ends of weight 33 via bolts 39 and 41, or any other suitable attachment means. Eccentrically mounted weight 33 is mounted to master shaft 19 such that it is symmetrically balanced on opposite sides of the longitudinal centroidal axis of material-conveying member 5, thereby preventing side-to-side canting or rocking of the material-conveying member 5 during rotation of weight 33.

Figure 3:
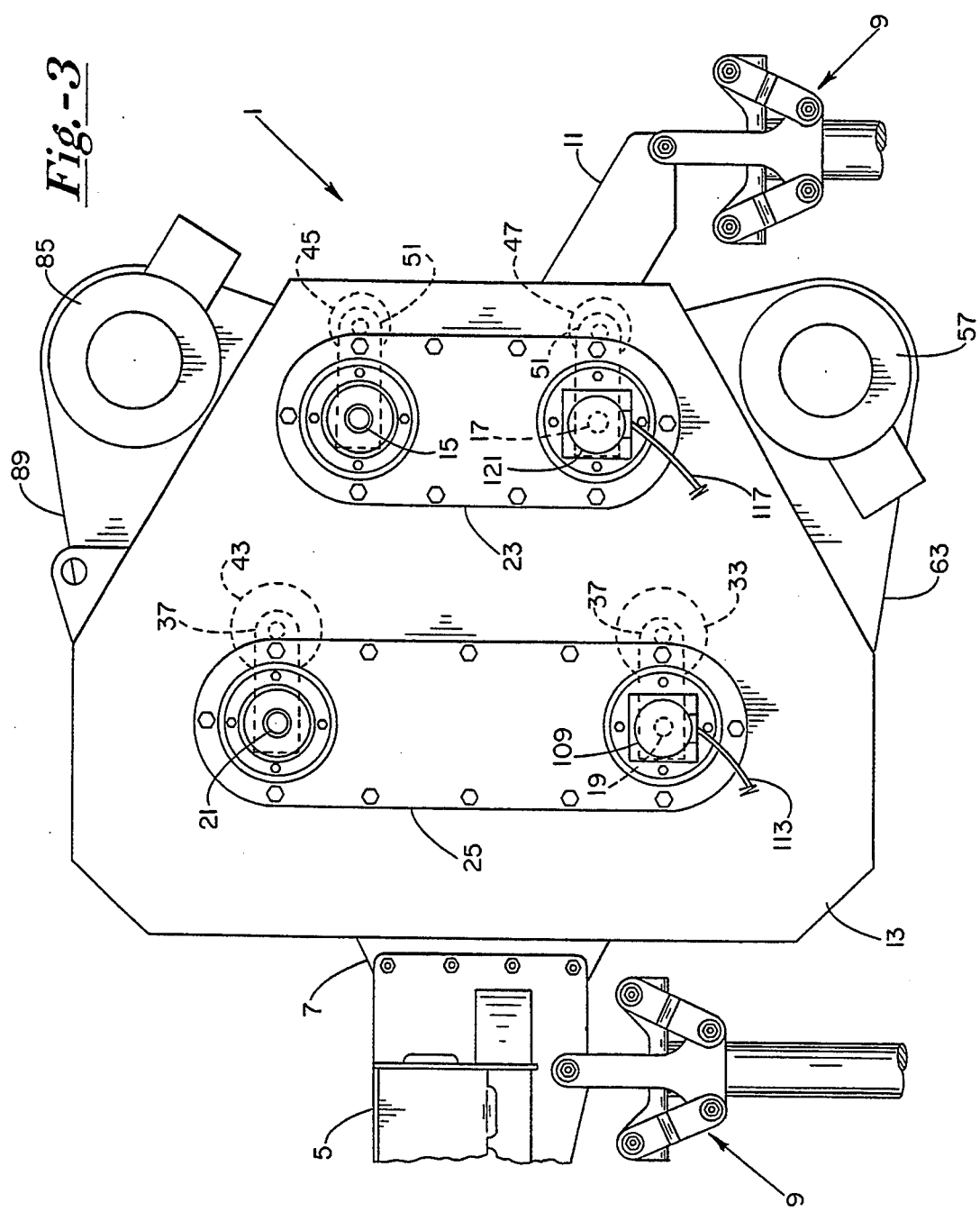
FIG. 3 is the opposite side-elevational view of the vibration-generating means shown in FIG. 1, where an exemplary set of master and slave weights are shown in phantom at a given nominal angular orientation relative to one another during rotation.

Master shaft 21 also carries an eccentrically mounted weight 43 which is of equal mass to weight 33 and similarly mounted in fixed relation to master shaft 21 via a second pair of support arms 35 and 37, only one of which is shown in phantom in FIG. 3. Eccentrically mounted weight 43 is similarly mounted to be symmetrically balanced on opposite sides of the longitudinal centroidal axis of material-conveying member 5, to thereby prevent side-to-side canting and rocking, as described above.

As shown in FIG. 3, corresponding weights 33 and 43 are eccentrically mounted and positioned in opposing relation on their respective master shafts 19 and 21 such that, upon simultaneous counter-rotation thereof, they effectively cancel each other's components of vibratory force in a direction normal to the longitudinal centroidal axis of the material-conveying member 5, and path of conveyance defined thereby. Consequently, the resultant vibratory force produced by eccentrically mounted weights 33 and 43 through simultaneously counter-rotation thereof is substantially devoid of any component of force in a direction normal to the longitudinal centroidal axis of the material-conveying member 5.

Similarly, slave shafts 15 and 17 also extend parallel to one another, and parallel to master shafts 19 and 21. Slave shafts 15 and 17 are also symmetrically positioned above and below the longitudinal centroidal axis of material-conveying member 5, and carry respective eccentrically mounted weights 45 and 47 of equal mass. As best shown in FIG. 2, weight 45 is eccentrically mounted in fixed relation to slave shaft 15 for free-swinging movement therewith by a pair of spaced support arms 49 and 51, which are connected to opposite ends of weight 45 via bolts 53 and 55, or any other suitable securing means. Weight 45 is symmetrically mounted on slave shaft 15 to be balanced on opposite sides of the longitudinal centroidal axis of the material-conveying member 5, thereby preventing side-to-side canting or rocking of the material-conveying member 5 during rotation of weight 45.

Eccentrically mounted weight 47 is similarly mounted to slave shaft 17 in fixed relation for free-swinging movement therewith by another pair of spaced support arms 49 and 51 which connect to opposite ends of weight 47 via similar bolts 53 and 55, or other suitable securing means. Eccentrically mounted weight 47 is also symmetrically balanced on opposite sides of the longitudinal centroidal axis of material-conveying member 5, to prevent side-to-side canting and rocking during rotation of weight 47.

Similar to the positioning of weights 33 and 43 on master shafts 21 and 19, weights 45 and 47 are eccentrically mounted and positioned on their respective slave shafts 15 and 17 in opposing relation such that each weight cancels the other's components of vibratory force in a direction normal to the longitudinal centroidal axis of the material-conveying member 5 during simultaneous counter-rotation thereof at the same speed. Therefore, the resultant vibratory force produced through simultaneous counter-rotation of eccentrically mounted weights 45 and 47 will be substantially devoid of any component of force in a direction normal to the longitudinal centroidal axis of the material-conveying member 5.

By maintaining the above-described positional relationship between opposing eccentrically mounted weights 33 and 43 on master shafts 19 and 21, and the above-described positional relationship between eccentrically mounted weights 45 and 47 on slave shafts 15 and 17, the overall resultant vibratory force produced by the vibration-generating means 3 during rotation of all weights 33, 43, 45 and 47 will also be substantially devoid of any component of vibratory force in a direction normal to the longitudinal centroidal axis of the material-conveying member 5.

To maintain the positional relationship between the eccentrically mounted weights 33 and 43 on master shafts 19 and 21, such shafts are driven at the same speed by a first master drive motor 57 via a continuous belt 59. As shown best in FIG. 1, master drive motor 57 is mounted to the vibration-generating means 3 adjacent the lower end thereof, and includes a drive shaft 61 which extends outwardly therefrom through plate 63, where it drivingly engages a toothed drive pulley 65 that is fixedly mounted thereto and disposed exteriorly relative to housing 13. Also exterior to housing 13 are two master pulleys 67 and 69 which are connected to end portions of respective master shafts 19 and 21, which are journaled through the side of housing 13. Routed around drive pulley 65 and master pulleys 67 and 69 is continuous belt 59, which preferably extends from drive pulley 65 counter-clockwise around master pulley 67 and clockwise around master pulley 69 before returning to drive pulley 65.

Between master pulley 69 and drive pulley 65, belt 59 is routed around an adjustable idler pulley 71, which is used for adjusting the tension in belt 59. Adjustable idler pulley 71 is carried on mounting plate 73 which has an arcuate adjustment slot 75 for allowing pivotal movement of mounting plate 73 around pivot joint 77. To loosen or tighten belt 59, bolts 79 and 81 may be loosened, and rotation of adjustment screw 83 allows for desired loosening and tightening of belt 59. Once the proper tension of belt 59 is determined, screws 79 and 81 may be retightened to hold mounting plate 73 in the desired fixed position.

It is important to note that belt 59 extends around master pulleys 67 and 69 in opposite directions, thereby causing master shafts 19 and 21 to rotate in opposite directions to effect the desired cancellation of each other's components of vibratory force which are normal to the longitudinal centroidal axis of the material-conveying member 5. Since master shafts 19 and 21 are driven simultaneously at the same speed by master drive motor 57, their angular positions relative to one another will remain constant, thereby maintaining the desired direction of force application produced by weights 33 and 43 along the path of conveyance.

To control the operation of slave shafts 15 and 17, and to drive such shafts at the same speed, a second slave drive motor 85 drivingly engages a separate and second continuous belt 86 which, in turn, drives the slave shafts 15 and 17 in counter-rotating directions. Slave drive motor 85 is mounted to housing 13 in a similar manner as master drive motor 57, but is positioned adjacent the upper end of vibration-generating means 3. As can be seen in FIG. 1, master and slave drive motors 57 and 81 are symmetrically positioned and balanced about the longitudinal centroidal axis of the material-conveying member 5 to maintain the symmetrically balanced relationship of the vibration-generating means 3 to the material-conveying member 5, and thereby prevent undesirable ancillary vibratory forces from being imparted to the material-conveying member 5 as a result of unbalanced motion by the vibration-generating system.

Similar to master drive motor 57, slave drive motor 85 includes a drive shaft 88 which extends outwardly through plate 89, where it fixedly engages a toothed drive pulley 87, which is exteriorly disposed relative to housing 13. Slave pulleys 93 and 95 are also disposed exteriorly relative to housing 13, where slave pulley 93 fixedly engages one end portion of slave shaft 15, which is journaled through the side of housing 13, and slave pulley 95 fixedly engages one end portion of slave shaft 17, which is also journaled through the side of housing 13. Continuous belt 86 is engaged by drive pulley 87 and preferably extends therefrom around slave pulley 93 in a clockwise direction, and therefrom around slave pulley 95 in a counter-clockwise direction, before it returns to drive pulley 87. Between slave pulley 95 and drive pulley 87, continuous belt 86 extends around an adjustable idler pulley 97, which is constructed and functions identically to idler pulley 71, previously described herein. Without repeating such description, it is readily apparent from FIG. 1 that adjustment screw 99 may be tightened or loosened to cause pivotal movement of idler wheel 97 about pivot joint 101, to thereby loosen or tighten belt 86, as desired.

Again, it is important to note that belt 86 extends around slave pulleys 93 and 95 in opposite directions to thereby cause slave shafts 15 and 17 to rotate in opposite directions, so as to effect the desired cancellation of each other's components of vibratory force which are normal to the longitudinal centroidal axis of the material-conveying member 5. Since slave shafts 15 and 17 are driven simultaneously at the same speed by drive motor 85, their angular positions relative to one another will remain constant, thereby maintaining the desired direction of force application produced by weights 45 and 47 along the path of conveyance. Note that safety cover 102 (shown in phantom) extends over all drive, slave and master pulleys of the drive system for the vibration generating means 103, thereby enclosing all such moving parts.

Under one set of exemplary conditions, as shown in FIG. 3, master weights 33 and 43 are of approximately four (4) times the mass as slave weights 45 and 47. Under such conditions, if the slave shafts 15, 17 rotate at twice the speed of the master shafts 19, 21, the total force generated by master weights 33 and 43 during rotation will be nearly equal to the total force generated by slave weights 45 and 47. Of course, the above ratio between weights may be altered as desired to create the optimum magnitude of vibratory force to be applied to the material-conveying member 5 for a given situation.

As indicated above, it has been found preferable to operate slave shafts 15 and 17 at a normal speed which averages twice that of master shafts 19 and 21. Although it is contemplated that other speed ratios between the slave shafts 15, 17 and master shafts 19, 21 may be used to provide a given application of vibratory force, it has been found that the ratio of 2:1 is most effective in providing the desired slow advance/quick return conveyor stroke for conveying materials without imparting components of vibratory force normal to the desired path of conveyance. To maintain the average speed of slave shafts 15 and 17 at twice the speed of master shafts 19 and 21, slave pulleys 93 and 95 are constructed at one-half the diameter of master pulleys 67 and 69, and the speed of slave drive motor 85 is maintained such that, on the average, it is the same as the speed of master drive motor 57. The half-size slave pulleys 93 and 95 effectively increase the speed of the slave shafts 15, 17 by two-fold relative to the master shafts 19, 21.

To illustrate the effect of a 2:1 speed ratio between slave shafts 15, 17 and master shafts 19, 21, reference is made to FIG. 3, where an exemplary set of weights are shown in phantom at a given nominal angular orientation relative to one another, such that, at one instant in time, the eccentrically mounted weights 45 and 47 on slave shafts 15 and 17 (hereinafter referred to collectively as "slave weights 45, 47") and the eccentrically mounted weights 33 and 43 on master shafts 19 and 21 (hereinafter referred to collectively as "master weights 33, 43") are all oriented in the same direction pointing opposite the direction of conveyance. Under such circumstances, the resultant force at the instant of time shown in FIG. 3 will be the sum of the force produced by both the master weights 33, 43 and slave weights 45, 47, in a direction opposite the direction of conveyance.

A 90° counter-rotation of master shafts 19 and 21 will result in a 180° rotation of slave shafts 15 and 17. Under such conditions, weights 33 and 43 align in vertically opposing orientation, and produce no force in the direction of conveyance, leaving only a less significant force in such direction produced by slave weights 45, 47.

An additional 90° counter-rotation of master weights 33, 43 results in another 180° rotation of slave weights 45, 47. Master weights 33, 43 are then aligned in the direction of conveyance, and slave weights 45, 47 are aligned in a direction opposite the direction of conveyance, thereby canceling the force of master weights 33, 43 to produce virtually no net resultant force in the direction of conveyance.

Another 90° counter-rotation of master weights 33, 43 will again result in another 180° rotation of slave weights 45, 47. Under such conditions, master weights 33, 43 are again aligned in opposing vertical orientation and produce no force along the path of conveyance, while slave weights 45, 47 are once again aligned in the direction of conveyance, thereby producing a less significant force in the direction of conveyance. One further 90° counter-rotation of master shafts 33, 43 will complete the revolutionary cycle and cause all weights to re-align in the direction opposite the direction of conveyance, thereby beginning a new cycle.

As can be seen from the above illustration, through one cycle of rotation of master weights 33, 43, there is a relatively short but strong force applied to the material-conveying member 5 in the direction opposite the direction of conveyance, followed by a series of relatively less significant forces applied to the material-conveying member 5 in the direction of desired conveyance. The short large force will effectively cause the material being conveyed to slip on the material-conveying member 5, while the less significant forces over the remainder of the cycle will convey the product forward in the desired direction of conveyance. Thus, as can be seen, by rotating the slave weights 45, 47 at a speed twice that of the master weights 33, 43, the desired slow advance/quick return conveyor stroke is produced. Since the relative angular positions of master weights 33 and 43 remain constant to one another, and the same relationship is true with respect to slave weights 45 and 47, the slow advance/quick return conveyor stroke is substantially devoid of any components of force directed normal to the desired path of conveyance.

Other than the above-mentioned positional relationships between the eccentrically mounted weights on the slave and master shafts, unlike the conventional conveyors described previously, it is the specific purpose of the instant invention to be capable of altering the angular position of the slave weights 45, 47 relative to the angular position of the master weights 33, 43. Such angular displacement or phase differential between the slave weights 45, 47 and master weights 33, 43 facilitates alteration of the application of vibratory force to the material-conveying member 5, without changing the direction of the line of the resultant vibratory force imparted thereto.

Through the use and control of dual drive motors 57 and 85, it is possible to alter the angular position of the slave weights 45, 47 relative to the angular position of the master weights 33, 43 to produce a desired change in the application of vibratory force to the material-conveying member 5. Changing the speed of the slave drive motor 85 relative to the master drive motor 57 will cause the speed of the slave shafts 15, 17 to change, thereby changing the angular position of the slave weights 45, 47 relative to the master weights 33, 43. However, such change in speed must only be temporary, since the ratio between the speed of the slave shafts 15, 17 and master shafts 19, 21 must normally remain constant to provide a uniform repeating conveyor stroke. Since the control and operation of slave weights 45, 47 depends on the operation of master weights 33, 43, such weights are appropriately referred to as "slave" and "master" weights, respectively.

Such a change in the application of vibratory force to the material-conveying member 5 may be accomplished during the operation of the conveyor system 1, without the need for stopping the conveyor system. Both the speed and direction of conveyance may be altered during operation of the conveyor system by changing the resultant application of vibratory force to the material-conveying member 5 through adjustment of the angular position of slave weights 45, 47 relative to the master weights 33, 43.

Figure 5:
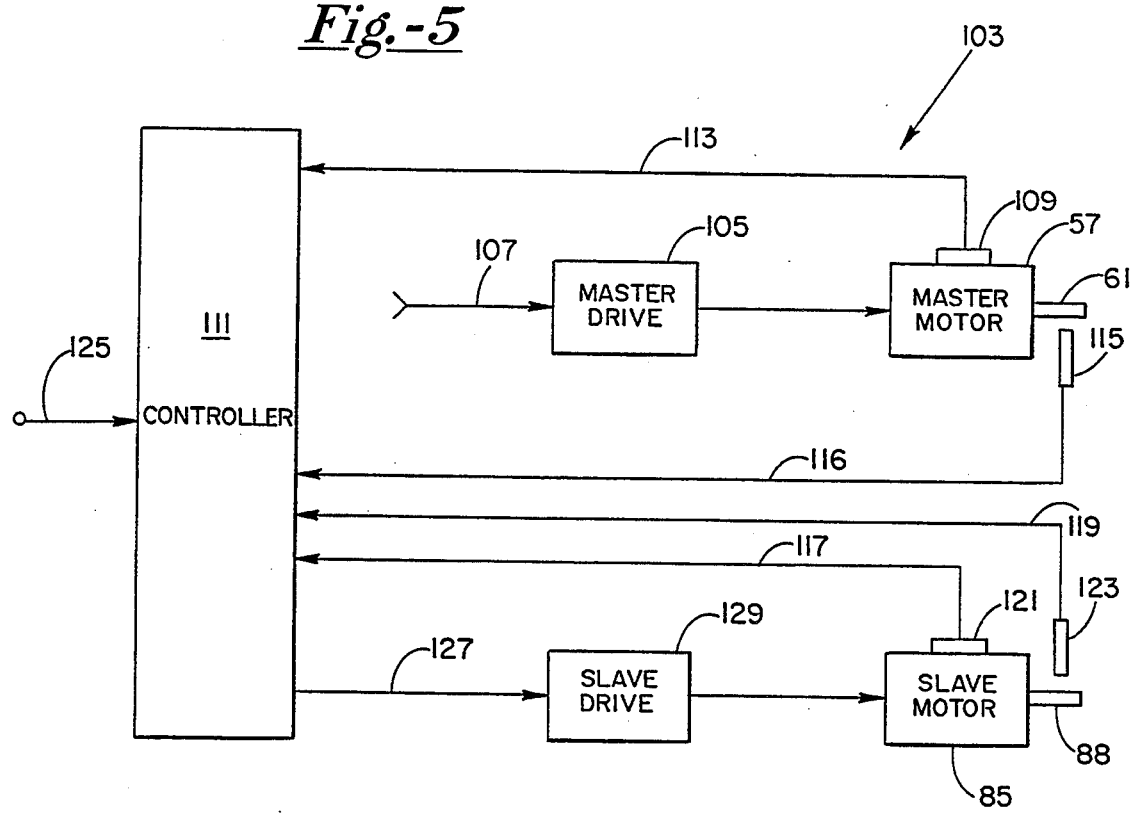
FIG. 5 is a schematic block representation of the vibration-control mechanism which controls the application of vibratory force to the material-conveying member of the conveyor system.

To accomplish the above objective, a vibration-control mechanism 103, as shown in FIG. 5, is employed for monitoring the relative angular positions of the slave weights 45, 47 and master weights 33, 43, and for controlling the relative angular displacement or phase differential therebetween. In the preferred embodiment, the vibration-control mechanism 103 uses a synchronizing controller 111 manufactured by Fenner Industrial Controls, 8900 Zachary Lane North, P.O. Box 9000, Maple Grove, Minn. 55369, Model No. 3200-1820, M-Rotary, as its central control system. It can be appreciated, however, that other types of synchronizing controllers of different forms may be employed to provide the desired function and control of the master and slave weights, which is described hereafter.

The components shown in the schematic of FIG. 5 are block representations only, and are interconnected via single representative control lines for clarity and illustrative purposes, it being understood that such control lines oftentimes represent multiple data or control lines that may be required, depending upon the input-/output requirements of the various components of the control system. Power and ground connections have also been omitted for the same reason as above, it being understood that such connections are to be made in a conventional manner well known in the art.

As shown in FIG. 5, the inverter of the master drive 105 of master drive motor 57 is set with a predetermined, but adjustable, speed from an external speed reference input at line 107, which is generally provided from the control software (not shown) of the conveyor system 1. An incremental master encoder 109 is mounted on master shaft 19 in a manner well known in the art, and produces a pulse train which is transmitted to controller 111 along line 113. Controller 111 uses the pulse train generated by master encoder 109 to monitor the speed and direction of the master drive motor 57 in a manner also well known in the art.

Also mounted on the vibration-generating means 3 adjacent master shaft 19 is a proximity sensor 115 which senses the presence of eccentric weight 33 as it passes thereby during rotation thereof. Sensor 115 generates a master proximity pulse upon sensing the presence of weight 33, which is transmitted to controller 111 on input line 116.

A second proximity sensor 123 is similarly mounted to the vibration-generating means 3 in a corresponding position adjacent slave shaft 17, so as to monitor and sense the presence of eccentrically mounted weight 47 as it passes thereby during rotation. Sensor 123 produces a slave proximity pulse upon sensing passage of weight 47, which is transmitted to controller 111 along input line 119.

An incremental encoder 121 is mounted on slave shaft 17, which produces a pulse train that is transmitted to controller 111 via input line 117. Slave encoder 121 produces a predetermined number of pulses for each revolution of slave shaft 17, so the amount of angular movement of slave shafts 15, 17 for each occurrence of a slave encoder pulse is known to the controller 111. As will be described in more detail hereafter, the pulse train generated by slave encoder 121 is monitored by the controller 111, and used in conjunction with the master and slave proximity pulses generated by master and slave proximity sensors 115 and 123, respectively, to determine the relative angular displacement between the slave weights 45, 47 and the master weights 33, 43.

The central controller 111 includes an angular displacement selector means which may be programmed with a preselected target angular displacement or phase differential that is desired between the slave weights 45, 47 and master weights 33, 43. Since the amount of angular movement of slave shafts 15, 17 is known for each occurrence of a slave encoder pulse, the target angular displacement is defined as a predetermined number of slave encoder pulses which must be present between successive occurrences of master and slave proximity pulses. For such preselected programming of controller 111, representative control line 125 is provided into which the desired target angular displacement, defined as a predetermined number of slave encoder pulses, may be inputted.

The controller 111, after first monitoring and sensing the presence of a master proximity pulse on input line 116, uses an internal counter to count the number of pulses generated by the slave encoder 121 between such time that the master proximity pulse occurs and such time that a slave proximity pulse is sensed on line 119. The actual number of slave encoder pulses counted by controller 111 represents the relative angular displacement between the slave weights 45, 47 and master weights 33, 43.

The controller 111 then uses an internal comparator means to compare the actual number of slave pulses counted between the occurrence of the master proximity pulse and slave proximity pulse with the desired target angular displacement therebetween (which is defined as a predetermined number of slave encoder pulses). If the number of counted slave encoder pulses differs from the number of pulses defining the desired target angular displacement, the controller 111 transmits a signal along line 127 to the inverter of the slave drive 129, which alters the operating frequency of the inverter to cause an appropriate temporary adjustment of the speed of the slave motor 85.

Controller 111 temporarily increases or decreases the speed of slave motor 85, as needed, to cause an appropriate change in the angular position of the slave weights 45, 47 relative to the angular position of the master weights 33, 43, such that the relative angular displacement therebetween will approach the desired target angular displacement. Causing such an appropriate change in the speed of slave motor 85 effectively increases or decreases the number of counted slave encoder pulses so as to approach the number of pulses defining the desired target angular displacement. The actual number of slave encoder pulses between occurrences of successive master and slave proximity pulses is automatically and periodically sampled on a continual basis by controller 111, and compared to the number of slave pulses defining the target angular displacement, so that the actual relative angular displacement between slave weights 45, 47 and master weights 33, 43 match, and are maintained at the preselected target angular displacement. Adjustments in the angular position of the slave weights 45, 47 to meet the target angular displacement between the slave weights 45, 47 and master weights 33, 43 are automatically provided by controller 111 as needed in the manner described above.

The adjustments to the slave drive motor 85 are accomplished through the controller's use of an internal proportional-integral-derivative (PID) loop, the construction of which is well known to those skilled in the art. Through the use of a PID loop, the controller 111 continually compares the actual relative angular displacement with the desired target angular displacement between the slave weights 45, 47 and master weights 33, 43. As a result thereof, temporary adjustments are made to the speed of the slave motor 85, as needed, to maintain the actual relative angular displacement between slave weights 45, 47 and master weights 33, 43 at the desired target angular displacement, and to maintain rotation of slave shafts 15, 17 at an average speed which is twice that of master shafts 19, 21. Failure to maintain the proper speed ratio between respective slave and master shafts of the conveyor system will result in continual varying of the application of vibratory forces to the material-conveying member 5 which, although conceivable, is not generally desired. Through the use of the controller 111 PID loop, the speed of the slave shafts 15, 17 is maintained at the desired ratio of the master shafts, and the relative angular displacement therebetween may be maintained and altered as necessary to match the target angular displacement which is inputted to controller 111.

If, for whatever reason, it becomes desirable to change the speed and/or direction of conveyance of a given product being conveyed, the operator may do so at will, during operation of the conveyor system 1, by altering the relative angular displacement or phase differential between the slave weights 45, 47 and master weights 33, 43, thereby altering the resultant application of vibratory force to the material-conveying member 5. This may be accomplished by simply selecting a new target angular displacement and inputting the corresponding number of slave encoder pulses to controller 111 on control line 125.

Controller 111, which is continually monitoring the relative angular positions of the slave weights 45, 47 and master weights 33, 43, automatically senses any difference between actual counted slave encoder pulses and a newly selected target number of slave encoder pulses which are to occur between successive master and slave proximity pulses generated by master proximity sensor 115 and slave proximity sensor 123. Upon sensing such a difference, controller 111 makes an appropriate temporary adjustment to the speed of the slave motor 85, as described above, to cause the actual relative angular displacement between slave weights 45, 47 to match the newly selected target angular displacement therebetween. In altering the application of vibratory force to the material-conveying member 5, no forces are applied thereto in a direction normal to the longitudinal centroidal axis thereof, since the positional relationship between opposing master weights 33, 43, and the positional relationship between opposing slave weights 45, 47, remains unchanged.

Figure 4:
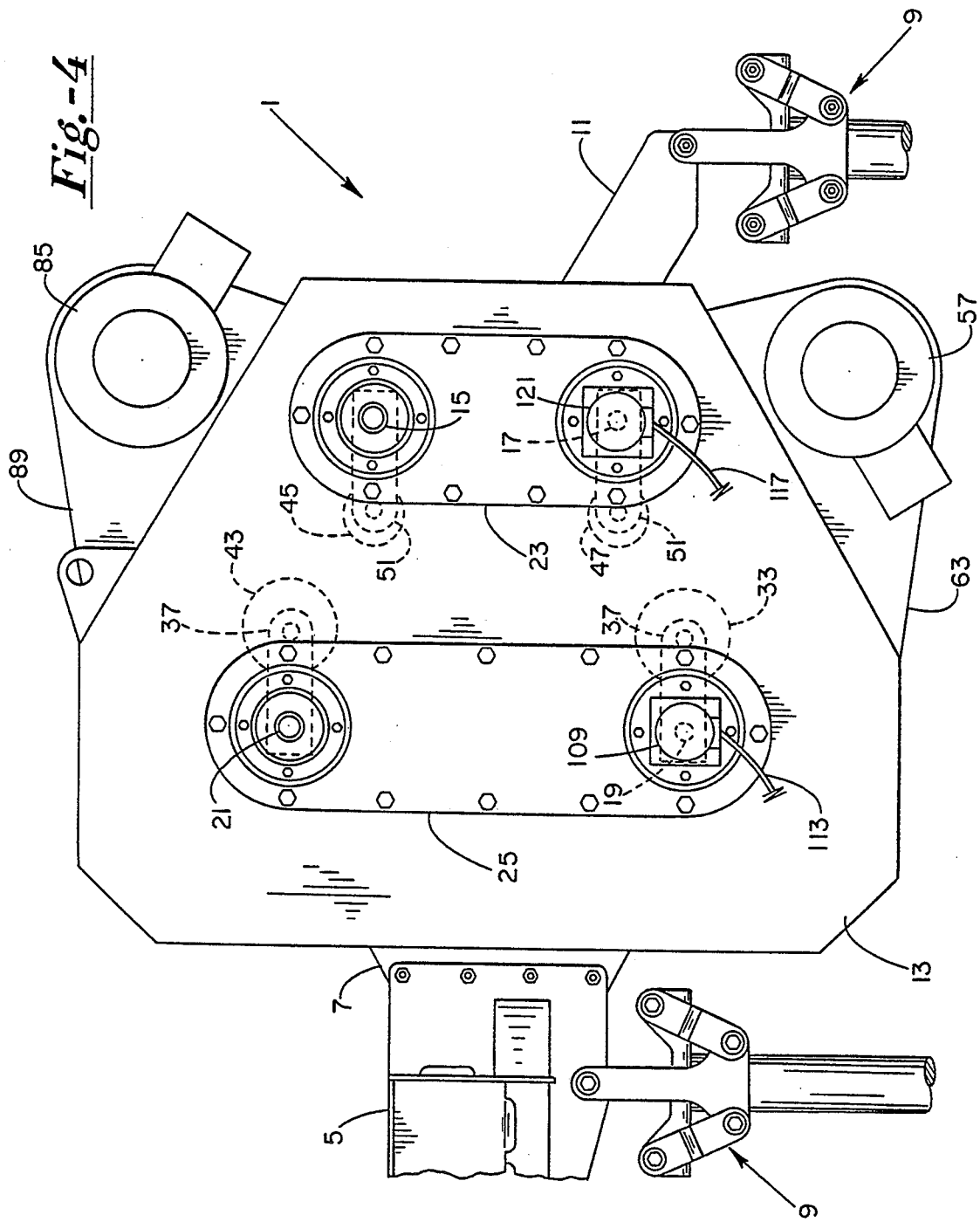
FIG. 4 is another opposite side-elevational view of the vibration-generating means shown in FIG. 1, where the slave weights have been angularly displaced relative to their orientation as depicted in FIG. 3.
Figure 6A:
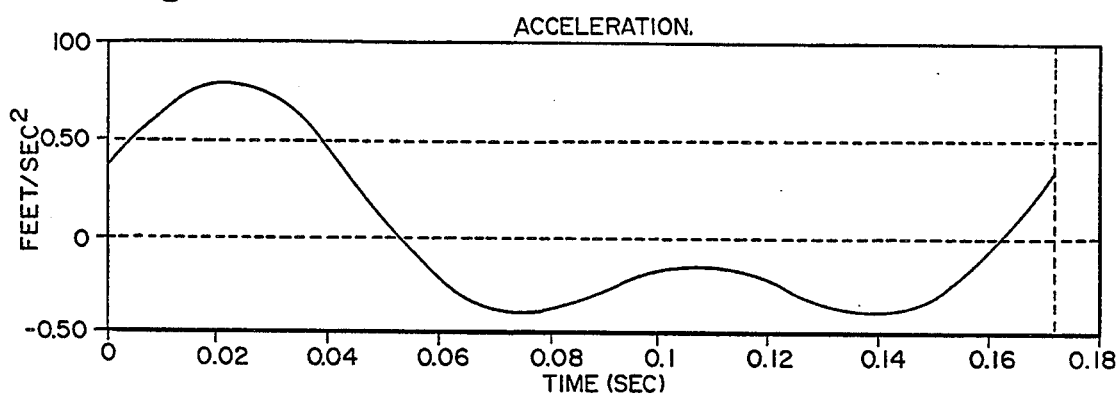
FIG. 6A is a plotted graph representing the acceleration of a material-conveying member over one revolutionary cycle, where the master and slave weights of the vibration generating means are oriented as shown in FIG. 3.
Figure 6B:
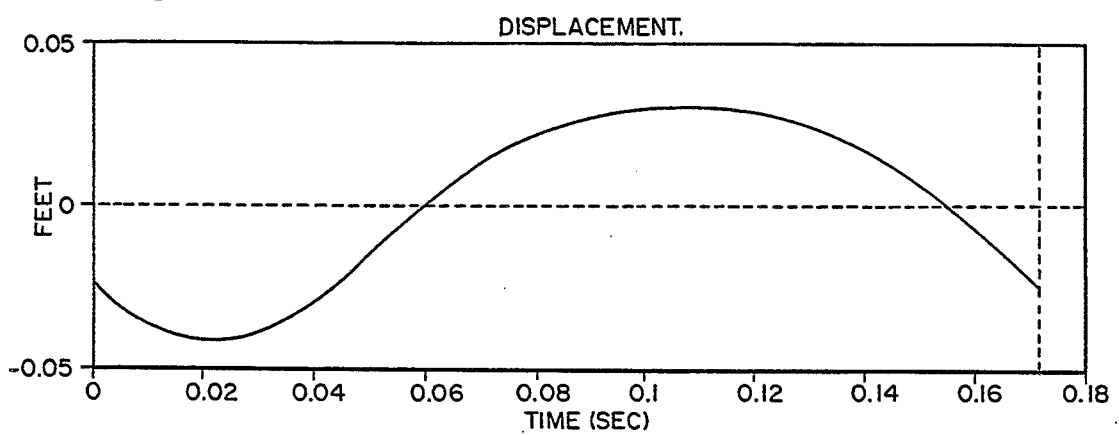
FIG. 6B is a plotted graph of the displacement of a material-conveying member over one revolutionary cycle, where the master and slave weights of the vibration-generating means are oriented as depicted in FIG. 3.
Figure 7A:
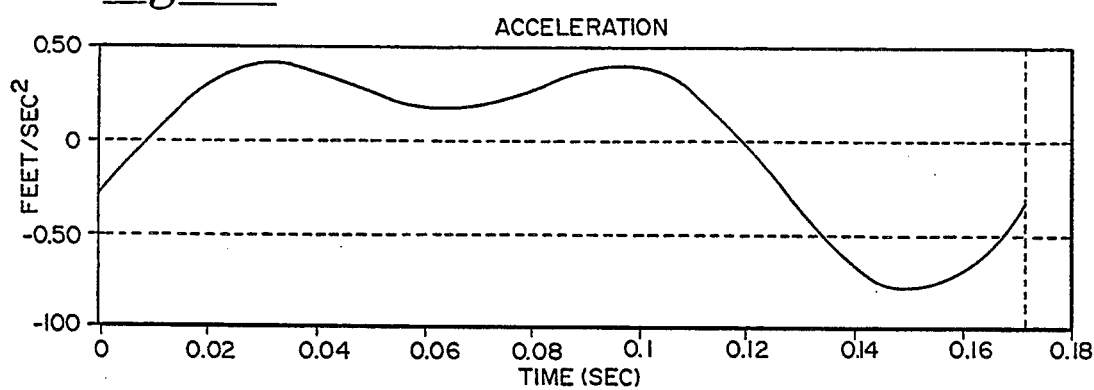
FIG. 7A is a plotted graph of the acceleration of the material-conveying member over one revolutionary cycle, where the master and slave weights of the vibration-generating means are oriented as depicted in FIG. 4.
Figure 7B:
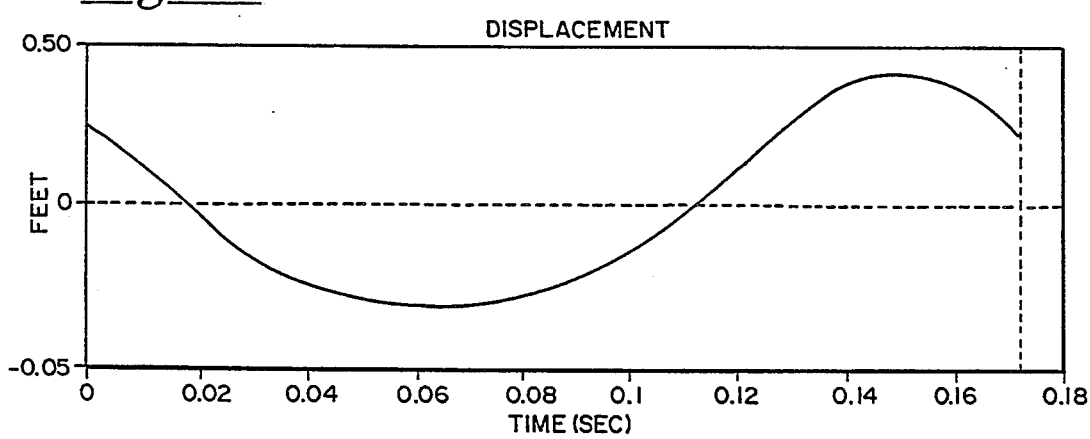
FIG. 7B is a plotted graph of the displacement of a material-conveying member over one revolutionary cycle, where the master and slave weights of the vibration-generating means are oriented as depicted in FIG. 4.

To illustrate the operation and usefulness of our dual drive conveyor system 1 with its vibration-control mechanism 103, reference is made to FIGS. 6A thru 7B. FIGS. 6A and 6B are plotted graphs of the acceleration and displacement transfer functions over one revolutionary cycle for a set of master weights 33, 43 and slave weights 45, 47, oriented as shown in FIG. 3. FIGS. 7A and 7B are plotted graphs of the acceleration and displacement transfer functions over one revolutionary cycle of a set of master weights 33, 43 and slave weights 45, 47, oriented as shown in FIG. 4, where slave weights 45, 47 have been displaced angularly 180° relative to master weights 33, 43 via the use of vibration-control mechanism 103.

For purposes of illustration in FIGS. 6A thru 7B, a conveyor system with a rotating speed of 350 RPM on the master shafts 19, 21, and an average speed of 700 RPM on the slave shafts 15, 17, has been chosen. Also, master weights 33, 43 have been chosen to have a mass that will produce a maximum resultant combined force which is 1.5 times the maximum resultant combined force produced by slave weights 45, 47. The total conveyor stroke will be restricted to approximately one inch.

Under the above conditions, as shown in FIG. 6A, through one complete revolution of master shafts 33 and 43 (two revolutions for slave shafts 45 and 47), the acceleration of material-conveying member 5 peaks in one direction at about 80 ft/sec² shortly after 0.02 seconds (corresponding to the position of weights in FIG. 3). The material-conveying member 5 thereafter decelerates and begins accelerating in the opposite direction at about 0.05 seconds. During the period of time from about 0.05 seconds to approximately 0.16 seconds, the material-conveying member continues to accelerate at a variably reduced level (a maximum of about 41 ft/sec²) in the opposite direction of its initial acceleration, and thereafter again decelerates and begins accelerating in the initial direction upon beginning a new cycle. Note that the initial acceleration is much stronger over a shorter period of time than the subsequent acceleration in the opposite direction, giving rise to the desired slow advance/quick return conveyor stroke.

As can be seen in FIG. 6B, the graph of the corresponding displacement transfer function shows the displacement of material-conveying member 5 over a corresponding period of time covering a single conveyor stroke. As can be seen from the graph in FIG. 6B, from rest, the material-conveying member 5 is initially displaced rapidly in one direction a distance of approximately 0.042 feet (0.5 inches), and then reverses and begins a rather slow and gradual movement to a maximum displacement in the opposite direction of about 0.03 feet (0.36 inches), where it then begins another rapid movement in the initial direction. The total displacement or conveyor stroke of the material-conveying member 5 is approximately 0.86 inches, which approaches the desired preselected limit of approximately 1 inch. Such rapid movement in one direction, and rather slow advance in the opposite direction, provides the desired slow advance/quick return conveyor stroke which is desired to convey product with vibratory forces which are directed substantially only along the desired path of conveyance, without introducing vibratory forces in a direction normal thereto.

It is noted that a product which has a friction coefficient of about 0.4 to 0.5 will stick to the conveyor member 5 and move therewith when the acceleration of the material-conveying member 5 is less than about 15 ft/sec², and the product will slip on the material-conveying member 5 for accelerations which exceed about 15 ft/sec². Therefore, with reference to FIG. 6A, it can be seen that the product will slip upon movement of the material-conveying member 5 in the direction of the upward acceleration peak of about 80 ft/sec², and the product will convey as it is accelerated in the direction of the downward peaks, during those portions of the curve when the acceleration is less than about 15 ft/sec². This coincides with the disclosure in FIG. 6B where the initial displacement of the material-conveying member 5 in one direction is rapid, causing the product to slip, and thereafter enters a relatively slow period of advance wherein the product will convey on material-conveying member 5.

Under the conditions shown in FIG. 4, where the slave weights 45, 47 have been angularly displaced 180° relative to their positions depicted in FIG. 3, via the control of vibration control mechanism 103, the direction of conveyance will reverse. As can be seen in FIGS. 7A and 7B, with the master and slave weights oriented as shown in FIG. 4, the plotted waveforms of the acceleration and displacement of the material-conveying member 5 are essentially inverted from those waveforms shown in FIGS. 6A and 6B. Thus, the period of rapid acceleration and displacement of material-conveying member 5 has reversed direction, as has the more slower and gradual period of acceleration and displacement. It is, therefore, readily apparent that the application of vibratory force to the material-conveying member 5 has been altered through the use of vibration-control mechanism 103 to effectively reverse the acceleration and displacement characteristics of the material-conveying member 5. Consequently, the relative movement of material-conveying member 5 is effectively reversed, as is the conveyance of the product carried thereby.

It should be understood that the above exemplary conditions showing the results of a 180° angular displacement from one nominal set of angular positions of the respective slave and master weights shown in FIG. 3 to a second set of relative angular positions shown in FIG. 4 only illustrates one conceivable alteration in the application of vibratory force. The vibration-control mechanism 103 can be reprogrammed with a new and different target angular displacement at any time during operation of the conveyor, to effect a new angular displacement of any desired relationship.

Figure 8A:
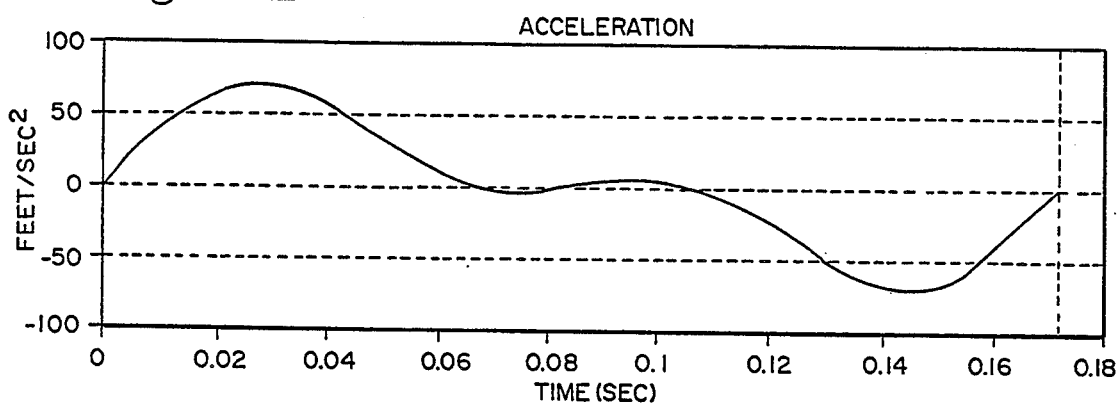
FIG. 8A is a plotted graph of the acceleration of a material-conveying member over one revolutionary cycle, where the master and slave weights are angularly displaced in such orientation as to produce no net product conveyance.
Figure 8B:
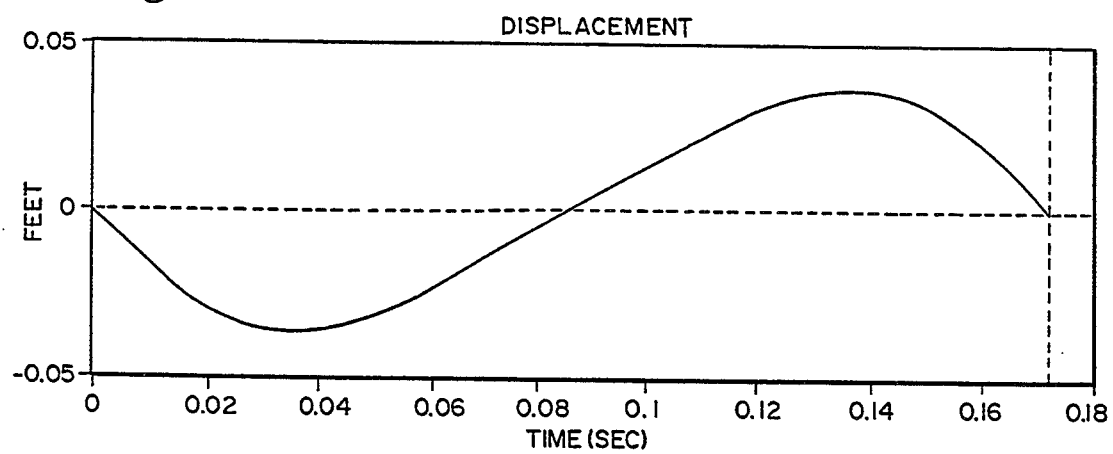
FIG. 8B is a plotted graph of the displacement of a material-conveying member over one revolutionary cycle, where the master and slave weights are angularly displaced in such orientation as to produce no net product conveyance.

For instance, re-programming controller 111 with a target angular displacement of 90° (translated into slave encoder pulses) from an initial nominal orientation, as shown in FIG. 3, will produce a new application of vibratory force that will cause material-conveying member 5 to oscillate symmetrically about its initial position of rest, with no net conveyance in either direction. As shown in FIGS. 8A and 8B, under such circumstances, the acceleration and displacement waveforms are symmetrical about the origin and the middle of the cycle, thereby producing no net conveyance, and effectively reducing the conveyance speed to zero. With the slave weights 45, 47 and master weights 33, 43 in such orientation, increasing the relative angular displacement slightly will cause conveyance to begin in one direction, while decreasing the relative angular displacement will cause conveyance to begin in the opposite direction. Of course, numerous other target angular displacements may be selected between the above illustrated cases to give rise to varying applications of vibratory force, and consequently varying speeds of product conveyance.

By continually monitoring the relative angular positions of the master weights 33, 43 and slave weights 45, 47, controller 111 will automatically adjust the speed of the slave drive motor upon detecting any change between the actual relative angular displacement and target angular displacement which is programmed into controller 111. The operator of the conveyor system is able to change the application of vibratory force to the material-conveying member 5, during operation thereof, consequently changing the speed and/or direction of conveyance, without introducing undesirable vibratory forces in a direction normal to the desired path of conveyance. As previously indicated, this represents a distinct advantage over conventional conveyor systems which necessarily require a change in the direction of the resultant line of vibratory force in order to change the speed or direction of conveyance.

Through use of our dual drive conveyor system with vibrational control, it is possible to determine the optimal application of vibratory force which produces the best conveyance speed for a given material which is to be conveyed. An operator may select a given target angular displacement and, through use of vibrational control mechanism 103, monitor, compare and adjust the actual relative angular displacement of slave weights 45, 47 relative to master weights 33, 43 as needed to obtain the target angular displacement therebetween. Once the desired target angular displacement is reached, the operator may monitor and record the conveyance speed of the material relative to the selected target angular displacement, and then change the target angular displacement and repeat the above process until the above optimal speed of conveyance is determined. From the above, it can be readily determined what desired target angular displacement a given conveyor must be set at in order to provide the necessary application of vibratory force to effect optimal conveyance of the material. It is noted, of course, that the optimal speed for any one given material depends upon the physical properties thereof, and may not necessarily be the fastest speed at which the material can be conveyed.

It will, of course, be understood that various changes may be made in the form, details, arrangement and proportions of the parts without departing from the scope of the invention which comprises the matter shown and described herein and set forth in the appended claims.

We claim:

1. A dual drive conveyor system with vibration control for adjusting the application of vibratory force to the material-conveying member without changing the direction of the resultant line of vibratory force generated thereby, comprising:

(a) an elongated material-conveying member having a longitudinal centroidal axis;

(b) a vibration-generating means connected to said material-conveying member for transmitting vibratory forces to said material-conveying member substantially only in a direction parallel with said longitudinal centroidal axis of said material-conveying member, said vibration-generating means further comprising:

(i) a first drive motor being drivingly connected to a pair of opposing parallel counter-rotating master shafts which rotate at a predetermined speed and are symmetrically positioned and disposed transversely relative to said longitudinal centroidal axis of said material-conveying member, each of said master shafts carrying at least one eccentrically mounted weight for rotation therewith, each said eccentrically mounted weight on each of said master shafts having a corresponding eccentrically mounted weight of equal mass carried by said opposing master shaft, each said eccentric weight and said corresponding eccentric weight carried by said opposing master shafts being positioned such that the resultant vibratory force produced through simultaneous counter-rotation thereof is substantially devoid of any component of force in a direction normal to said longitudinal centroidal axis of said material-conveying member;

(ii) a second drive motor being drivingly connected to a pair of opposing parallel counter-rotating slave shafts which rotate normally at a speed averaging twice the speed of said master shafts and are symmetrically positioned and transversely disposed relative to said longitudinal centroidal axis of said material-conveying member, each of said slave shafts carrying at least one eccentrically mounted weight for rotation therewith, each said eccentrically mounted weight on each of said slave shafts having a corresponding eccentrically mounted weight of equal mass carried by said opposing slave shaft, each said eccentric weight and corresponding eccentric weight carried by said opposing slave shafts being positioned such that the resultant vibratory force produced through simultaneous counter-rotation thereof is substantially devoid of any component of force in a direction normal to said longitudinal centroidal axis of said material-conveying;

(c) monitoring means disposed in position sensing relation to said eccentric weights carried by said master and slave shafts for automatically and continually monitoring relative angular displacement between said eccentric weights carried by said slave shafts and said eccentric weights carried by said master shafts during rotation thereof;

(d) comparator means connected to said monitoring means for periodically comparing said relative angular displacement between said eccentric weights carried by said slave shafts and said eccentric weights carried by said master shafts with a predetermined target angular displacement therebetween;

(e) adjustment means responsively connected to said comparator means for automatic periodic adjustment of the speed of said second drive motor as needed to maintain said relative angular displacement between said eccentric weights carried by said slave shafts and said eccentric weights carried by said master shafts at said predetermined target angular displacement therebetween; and (f) selector means connected to said comparator means for changing said target angular displacement during the operation of the conveyor system, thereby providing for adjustment of the application of vibratory force to said material-conveying member during conveyor operation without changing the direction of the resultant line of vibratory force imparted to said material-conveying member.

2. The structure defined in claim 1, wherein said comparator means produces an adjustment signal representative of the required increase or decrease which is necessary to cause said relative angular displacement between said eccentric weights carried by said slave shafts and said eccentric weights carried by said master shafts to match said predetermined target angular displacement therebetween, said adjustment means being responsive to said adjustment signal to adjust the speed of said second drive motor accordingly to cause the necessary change in said relative angular displacement.

3. The structure defined in claim 1, wherein said monitoring means includes a slave encoder mounted on one of said slave shafts, said slave encoder being used in connection with master and slave proximity sensors to sense the angular position of said eccentric weights carried by said slave shafts relative to the angular position of said eccentric weights carried by said master shafts, and to determine and monitor the relative angular displacement therebetween.

4. The structure defined in claim 1, wherein each of said master shafts carries a master drive pulley which is drivingly engaged by a master drive belt that is connected in driven relation to said first drive motor, and each of said slave shafts carries a slave drive pulley which is drivingly engaged by a slave drive belt that is connected in driven relation to said second drive motor, said master drive pulleys being twice the diameter of said slave drive pulleys.

5. A dual drive conveyor system with vibration control for adjusting the application of vibratory force to the material-conveying member without changing the direction of the resultant line of vibratory force generated, comprising:

(a) an elongated material-conveying member having a longitudinal centroidal axis;

(b) a vibration-generating means connected to said material-conveying member for transmitting vibratory forces to said material-conveying member substantially only in a direction parallel with said longitudinal centroidal axis of said material-conveying member;

(c) said vibration-generating means including a first drive motor being drivingly connected to a pair of master shafts which carry opposing eccentrically mounted weights that generate substantially equal opposing forces in a direction normal to said longitudinal centroidal axis of said material-conveying member, and a second drive motor being drivingly connected to a pair of slave shafts which carry opposing eccentrically mounted weights that generate substantially equal opposing forces in a direction normal to said longitudinal centroidal axis of said material-conveying member; and (d) vibration control mechanism being connected to at least said second drive motor, said vibration control mechanism including means for adjusting the speed of said second drive motor to effect a change in angular position of said eccentric weights carried by said pair of slave shafts relative to the angular position of said eccentric weights carried by said pair of master shafts, to thereby controllably vary the application of vibratory force imparted to said material-conveying member by said vibration-generating means without changing the direction of the resultant line of said vibratory force.

6. The structure defined in claim 5, wherein said vibration control mechanism includes means for sensing and monitoring the angular position of said eccentric weight carried by at least one of said slave shafts relative to the angular position of said eccentric weight carried by at least one of said master shafts to determine the relative angular displacement therebetween, said sensing and monitoring means being connected to said speed adjusting means of said second drive motor in controlling relation to cause automatic and periodic adjustment of the speed of said second drive motor to maintain said relative angular displacement at a predetermined target angular displacement.

7. The structure defined in claim 6, wherein said sensing and monitoring means of said vibration control mechanism includes a slave encoder mounted on one of said slave shafts, said slave encoder being used in connection with master and slave proximity sensors to sense the angular position of said eccentric weights carried by said slave shafts relative to the angular position of said eccentric weights carried by said master shafts, and to determine and monitor the relative angular displacement therebetween.

8. The structure defined in claim 7, wherein said master proximity sensor generates a master proximity signal upon sensing the presence of an eccentric weight carried by one of said master shafts, and said slave proximity sensor generates a slave proximity signal upon sensing presence of an eccentric weight carried by one of said slave shafts, said slave encoder generating a pulse train during rotation of said slave shaft to which it is mounted, and said vibration control mechanism having means for counting the pulses of said pulse train between such time that said master proximity signal and said slave proximity signal are generated, thereby determining said relative angular displacement between said eccentric weights carried by said slave shafts and said eccentric weights carried by said master shafts.

9. The structure defined in claim 8, wherein said predetermined target angular displacement is defined as a preselected number of slave encoder pulses which are desired between generation of said master proximity signal and said slave proximity signal, said vibration control mechanism including means for comparing said counted slave encoder pulses with said preselected number of slave encoder pulses and signaling said means for adjusting the speed of said second drive motor accordingly to cause said counted slave encoder pulses to match said preselected number of slave encoder pulses.

10. The structure defined in claim 6, wherein said vibration control mechanism includes a selector means for selectively varying said target angular displacement between said eccentric weights carried by said slave shafts and said eccentric weights carried by said master shafts during rotation thereof.

11. The structure defined in claim 6, wherein said vibration control mechanism includes means for periodically comparing said relative angular displacement with said predetermined target angular displacement between said eccentric weights carried by said slave shafts and said eccentric weights carried by said master shafts, said comparing means signaling to said speed adjustment means the necessary amount of adjustment to be made to the speed of said second drive motor in order to maintain said relative angular displacement at said predetermined target angular displacement.

12. The structure defined in claim 5, wherein said pair of master shafts and said pair of slave shafts extend parallel to one another, and are symmetrically positioned and disposed transversely relative to said longitudinal centroidal axis of said material-conveying member, said pair of master shafts and said pair of slave shafts being constructed and arranged such that the resultant vibratory force produced through simultaneous rotation thereof is substantially devoid of any component of force in a direction normal to said longitudinal centroidal axis of said material-conveying member.

13. The structure defined in claim 5, wherein said slave shafts are driven by said second drive motor at a predetermined speed which normally averages twice the speed that said master shafts are driven by said first drive motor.

14. The structure defined in claim 13, wherein each of said master shafts carries a master drive pulley which is drivingly engaged by a master drive belt that is connected in driven relation to said first drive motor, and each of said slave shafts carries a slave drive pulley which is drivingly engaged by a slave drive belt that is connected in driven relation to said second drive motor, said master drive pulleys being twice the diameter of said slave drive pulleys.

15. A dual drive conveyor system with vibration control for adjusting the application of vibratory force to the material-conveying member without changing the direction of the resultant line of vibratory force generated, comprising:

(a) an elongated material-conveying member having a longitudinal centroidal axis;

(b) a vibration-generating means connected to said material-conveying member for transmitting vibratory forces to said material-conveying member substantially only in a direction parallel with said longitudinal centroidal axis of said material-conveying member, said vibration-generating means further comprising:

(i) a first drive motor being drivingly connected to a pair of opposing parallel counter-rotating master shafts which rotate at a predetermined speed and are symmetrically positioned and disposed transverse to said longitudinal centroidal axis of said material-conveying member, said opposing counter-rotating master shafts carrying corresponding opposing eccentrically mounted weights that generate substantially equal opposing forces in a direction normal to said longitudinal centroidal axis of said material-conveying member so as to cancel substantially all of each other's vibratory forces which are generated in such direction as a result of simultaneous counter-rotation thereof;

(ii) a second drive motor being drivingly connected to a pair of opposing counter-rotating slave shafts which normally rotate at a predetermined ratio of the speed of said master shafts, and are symmetrically positioned and transversely disposed relative to said longitudinal centroidal axis of said material-conveying member, said opposing counter-rotating slave shafts carrying corresponding opposing eccentrically mounted weights that generate substantially equal opposing forces in a direction normal to said longitudinal centroidal axis of said material-conveying member so as to cancel substantially all of each other's vibratory forces which are generated in such direction as a result of simultaneous counter-rotation thereof;

(c) a vibration control mechanism having means for sensing and monitoring the angular position of at least one of said eccentric weights carried by said slave shafts relative to at least one of said eccentric weights carried by said master shafts, and determining the relative angular displacement therebetween, and means for adjusting the speed of said second drive motor automatically and periodically as needed during operation thereof to maintain said relative angular displacement at a predetermined target angular displacement between said eccentric weights carried by said slave shafts and said eccentric weights carried by said master shafts during rotation thereof, without introducing a resultant component of vibratory force in a direction transverse to said longitudinal centroidal axis of said material-conveying member.

16. The structure defined in claim 15, including an angular displacement selector means for optionally selecting a new target angular displacement between said eccentric weights carried by said slave shafts and said eccentric weights carried by said master shafts during operation of the conveyor system, said vibration control mechanism being responsively connected to said selector means to automatically adjust said relative angular displacement between said eccentric weights carried by said slave shafts and said eccentric weights carried by said master shaft to match said new target angular displacement therebetween.

17. The structure defined in claim 15, wherein said second drive motor drives said slave shafts normally at an average speed which is twice the speed at which said first drive motor drives said master shaft.

18. The structure defined in claim 17, wherein each of said master shafts carries a master drive pulley which is drivingly engaged by a master drive belt that is connected in driven relation to said first drive motor, and each of said slave shafts carries a slave drive pulley which is drivingly engaged by a slave drive belt that is connected in driven relation to said second drive motor, said master drive pulleys being twice the diameter of said slave drive pulleys.

19. The structure defined in claim 15, wherein said sensing and monitoring means of said vibration control mechanism includes a slave encoder mounted on one of said slave shafts, said slave encoder being used in connection with master and slave proximity sensors to sense the angular position of said eccentric weights carried by said slave shafts relative to the angular position of said eccentric weights carried by said master shafts, and to determine and monitor the relative angular displacement therebetween.

20. The structure defined in claim 19, wherein said master proximity sensor generates a master proximity signal upon sensing the presence of an eccentric weight carried by one of said master shafts, and said slave proximity sensor generates a slave proximity signal upon sensing presence of an eccentric weight carried by one of said slave shafts, said slave encoder generating a pulse train during rotation of said slave shaft to which it is mounted, and said vibration control mechanism having means for counting the pulses of said pulse train between such time that said master proximity signal and said slave proximity signal are generated, thereby determining said relative angular displacement between said eccentric weights carried by said slave shafts and said eccentric weights carried by said master shafts.

21. The structure defined in claim 20, wherein said predetermined target angular displacement is defined as a preselected number of slave encoder pulses which are desired between generation of said master proximity signal and said slave proximity signal, said vibration control mechanism including means for comparing said counted slave encoder pulses with said preselected number of slave encoder pulses and signaling said means for adjusting the speed of said second drive motor accordingly to cause said counted slave encoder pulses to match said preselected number of slave encoder pulses.

22. A method of determining the optimal application of vibratory force to obtain optimal conveyance speed for a given material which is being conveyed on a conveyor system in which the direction of the resultant line of vibratory force generated is substantially only parallel with the longitudinal centroidal axis of the material-conveying member of the conveyor system, comprising the steps of:

(a) providing a conveyor system having an elongated material-conveying member with a longitudinal centroidal axis, and a vibration-generating means connected to said material-conveying member for transmitting vibratory forces to said material-conveying member substantially only in a direction parallel with said longitudinal centroidal axis of said material-conveying member, said vibration-generating means including a first drive motor drivingly connected to a pair of master shafts which carry opposing eccentrically mounted weights that generate substantially equal opposing forces in a direction normal to said longitudinal centroidal axis of said material-conveying member, and a second drive motor drivingly connected to a pair of slave shafts which carry opposing eccentrically mounted weights that generate substantially equal opposing forces in a direction normal to said longitudinal centroidal axis of said material-conveying member;

(b) loading said material-conveying member with a desired material to be conveyed thereby;

(c) selecting a target angular displacement between said eccentric weights carried by said slave shafts and said eccentric weights carried by said master shafts during rotation thereof;

(d) determining the actual relative angular displacement between said eccentric weights carried by said slave shafts and said eccentric weights carried by said master shafts during conveyance of said material;

(e) comparing said actual relative angular displacement between said eccentric weights carried by said slave shafts and said eccentric weights carried by said master shafts with said selected target angular displacement therebetween;

(f) adjusting the speed of said second drive motor as needed to change said actual relative angular displacement between said eccentric weights carried by said slave shafts and said eccentric weights carried by said master shafts to substantially match said predetermined target angular displacement therebetween;

(g) determining the conveyance speed of said material being conveyed relative to said selected target angular displacement between said eccentric weights carried by said slave shafts and said eccentric weights carried by said master shafts;

(h) observing the effect upon the material being conveyed as it is so conveyed at such speed of conveyance;

(i) changing said target angular displacement between said eccentric weights carried by said slave shafts and said eccentric weights carried by said master shafts to a new target angular displacement;

(j) Repeat steps (d) through (i) until a desired optimal conveyance speed is determined for said material being conveyed.

23. The method defined in claim 22, wherein said step of determining the actual relative angular displacement between said eccentric weights carried by said slave shafts and said eccentric weights carried by said master shafts is accomplished through the use of a slave encoder mounted on one of said slave shafts, and master and slave proximity sensors mounted to said vibration-generating means to sense the angular position of said eccentric weights carried by said slave shafts relative to the angular position of said eccentric weights carried by said master shafts, thereby determining said relative angular displacement therebetween.

24. The method defined in claim 22, wherein said step of selecting said target angular displacement is accomplished by inputting said target angular displacement into an electronic vibration control mechanism which thereafter automatically performs the steps of determining the actual relative angular displacement and comparing it with said target angular displacement, and adjusting the speed of said second drive motor to cause said actual relative angular displacement to substantially match said target angular displacement.

25. The method defined in claim 22, wherein said step of adjusting the speed of said second drive motor is performed automatically and periodically as needed to maintain said actual relative angular displacement between said eccentric weights carried by said slave shafts and said eccentric weights carried by said master shafts at said predetermined target angular displacement therebetween.

26. A method of determining the optimal application of vibratory force to obtain optimal conveyance speed for a given material which is being conveyed on a conveyor system in which the direction of the resultant line of vibratory force generated is substantially only parallel with the longitudinal centroidal axis of the material-conveying member of the conveyor system, comprising the steps of:

(a) providing a conveyor system having an elongated material-conveying member with a longitudinal centroidal axis, and a vibration-generating means connected to said material-conveying member for transmitting vibratory forces to said material-conveying member substantially only in a direction parallel with said longitudinal centroidal axis of said material-conveying member, said vibration-generating means including a first pair of vibrator shafts which carry opposing eccentrically mounted weights that generate substantially equal opposing forces in a direction normal to said longitudinal centroidal axis of said material-conveying member, and a second pair of vibrator shafts which carry opposing eccentrically mounted weights that generate substantially equal opposing forces in a direction normal to said longitudinal centroidal axis of said material-conveying member, said second vibrator shafts normally rotating at an average speed which is a predetermined ratio of the speed of said first vibrator shafts;

(b) selecting and setting said eccentric weights carried by said second vibrator shafts at a predetermined nominal angular position relative to said eccentric weights carried by said first vibrator shafts to define a relative angular displacement therebetween;

(c) loading said material-conveying member with the desired material to be conveyed thereby;

(d) activating said vibration-generating means to convey the material thereon;

(e) determining the conveyance speed of said material being conveyed relative to said angular displacement between said eccentric weights carried by said second vibrator shafts and said eccentric weights carried by said first vibrator shafts;

(f) observing the effect upon the material being conveyed as it is so conveyed at such speed of conveyance;

(g) changing the angular position of said eccentric weights carried by said second vibrator shafts relative to the angular position of said eccentric weights carried by said first vibrator shafts, thereby changing said relative angular displacement therebetween;

(h) Repeat steps (e) through (g) until a desired optimal conveyance speed is determined for said material being conveyed.

27. The method defined in claim 26, wherein the step of providing a conveyor system includes providing said vibration-generating means with first and second drive motors, said first drive motor being drivingly connected to said first vibrator shafts, and said second drive motor being drivingly connected to said second vibrator shafts.

28. The method defined in claim 27, wherein the step of changing the angular position of said eccentric weights carried by said second vibrator shafts relative to the angular position of said eccentric weights carried by said first vibrator shafts is accomplished by changing the speed of said second drive motor.

29. The method defined in claim 27, wherein the step of changing the relative angular displacement between said eccentric weights carried by said second vibrator shafts and said eccentric weights carried by said first vibrator shafts includes the steps of selecting a target angular displacement therebetween, determining the actual relative angular displacement therebetween during conveyance of the material, comparing said actual relative angular displacement with said target angular displacement, and thereafter adjusting the speed of said second drive motor as needed to change said actual relative angular displacement between said eccentric weights carried by said second vibrator shafts and said eccentric weights carried by said first vibrator shafts to substantially match said target angular displacement therebetween.

30. The method defined in claim 29, wherein the step of changing the relative angular displacement between said eccentric weights carried by said second vibrator shafts and said eccentric weights carried by said first vibrator shafts is accomplished with an electronic vibration control mechanism.

* * * * *